(12) United States Patent
Cho et al.

(10) Patent No.: US 9,829,712 B2
(45) Date of Patent: Nov. 28, 2017

(54) LASER OPTICAL SYSTEM AND LASER ANNEALING DEVICE INCLUDING THE SAME

(71) Applicant: SAMSUNG DISPLAY CO., LTD., Yongin, Gyeonggi-Do (KR)

(72) Inventors: Joowoan Cho, Yongin (KR); Sanghoon Ahn, Yongin (KR); Byoungho Cheong, Yongin (KR); Byoungkwon Choo, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 190 days.

(21) Appl. No.: 14/800,547

(22) Filed: Jul. 15, 2015

(65) Prior Publication Data

US 2016/0252732 A1 Sep. 1, 2016

(30) Foreign Application Priority Data

Feb. 27, 2015 (KR) ........................ 10-2015-0028189

(51) Int. Cl.
*H01L 21/02* (2006.01)
*G02B 27/09* (2006.01)
(Continued)

(52) U.S. Cl.
CPC ...... *G02B 27/0927* (2013.01); *B23K 26/0006* (2013.01); *B23K 26/0066* (2013.01); *B23K 26/067* (2013.01); *B23K 26/0608* (2013.01); *B23K 26/0643* (2013.01); *B23K 26/352* (2015.10); *G02B 26/0816* (2013.01); *G02B 27/0905* (2013.01); *G02B 27/0977* (2013.01); *G02B 27/144* (2013.01);
(Continued)

(58) Field of Classification Search
CPC ............ G02B 27/0927; G02B 27/0905; G02B 27/0977; G02B 27/144; H01S 3/005; H01S 3/0071; B23K 26/08
USPC ............ 219/121.61–121.72, 121.77, 121.78, 219/121.73; 359/629, 636
See application file for complete search history.

(56) References Cited

U.S. PATENT DOCUMENTS 3,508,060 A * 4/1970 Boykin .................. H04B 10/60
398/212
6,188,477 B1 * 2/2001 Pu .......................... B82Y 30/00
356/368

(Continued)

FOREIGN PATENT DOCUMENTS

| JP | 5-31354 A | 2/1993 |
| JP | 2000-277454 A | 10/2000 |
| JP | 2010-207879 A | 9/2010 |

*Primary Examiner* — Samuel M Heinrich
(74) *Attorney, Agent, or Firm* — Lewis Roca Rothgerber Christie LLP (57) ABSTRACT

A laser optical system including: a beam splitter configured to split a laser beam into a first light and a second light by reflecting a portion of the laser beam and transmitting another portion of the laser beam; a first reflective member located in a path of the first light and reflecting the first light; and a second reflective member located in a path of the first light and reflecting the first light toward the beam splitter after the first light is reflected by the first reflective member, wherein a portion of the first light reflected toward the beam splitter is incident on and passes through the beam splitter and at least partially overlaps the second light.

15 Claims, 8 Drawing Sheets

(51) Int. Cl.
*H01S 3/00* (2006.01)
*G02B 27/14* (2006.01)
*G02B 26/08* (2006.01)
*B23K 26/08* (2014.01)
*B23K 26/00* (2014.01)
*B23K 26/06* (2014.01)
*B23K 26/067* (2006.01)
*B23K 26/352* (2014.01)
*B23K 101/40* (2006.01)

(52) U.S. Cl.
CPC ........... *B23K 2201/40* (2013.01); *H01S 3/005* (2013.01); *H01S 3/0071* (2013.01)

(56) References Cited

U.S. PATENT DOCUMENTS

| | | | |
|---|---|---|---|
| 2003/0164948 A1* | 9/2003 | Hill | G01B 9/02019 356/487 |
| 2006/0126678 A1 | 6/2006 | Sun et al. | |
| 2007/0025662 A1* | 2/2007 | Gugel | G02B 21/0032 385/39 |
| 2013/0215925 A1 | 8/2013 | Kaster et al. | |
| 2013/0222790 A1 | 8/2013 | Hirao | |

* cited by examiner

LASER OPTICAL SYSTEM AND LASER ANNEALING DEVICE INCLUDING THE SAME

CROSS-REFERENCE TO RELATED APPLICATION

This application claims priority to and the benefit of Korean Patent Application No. 10-2015-0028189, filed on Feb. 27, 2015, in the Korean Intellectual Property Office, the disclosure of which is incorporated herein in its entirety by reference.

BACKGROUND

1. Field

One or more exemplary embodiments relate to a laser optical system and a laser annealing device including the same.

2. Description of the Related Art

A laser is used in many industries for a variety of purposes. For example, poly-crystalline silicon, which is used in a thin film transistor of an organic light-emitting display device or a liquid crystal display device, is prepared by crystallizing amorphous silicon according to an annealing method using a laser.

Such an annealing method using a laser to form a poly-crystalline silicon layer as an active layer on a substrate is performed by irradiating an entire surface of the substrate with a linear beam having a constant length and a constant width. Here, the irradiation is performed by scanning the substrate with the linear beam.

A pulse laser beam of an excimer laser is mainly used as the laser beam for the annealing method. A cross-sectional shape of a laser beam (that irradiates the substrate for a set or predetermined period of time) influences a crystalline structure of the poly-crystalline silicon, and furthermore, will have a variety of impacts on quality of a display device.

Therefore, it has become an important issue to control not only the amount of time that the substrate is irradiated with the laser beam, but also the cross-sectional shape of the laser beam.

SUMMARY

One or more aspects of exemplary embodiments are directed toward a laser optical system and a laser annealing device including the same, wherein the laser optical system and the annealing device may obtain sufficient annealing effects by controlling a laser beam regarding pulse duration and a width thereof and by improving uniformity in a beam shape.

Additional aspects will be set forth in part in the description which follows and, in part, will be apparent from the description, or may be learned by practice of the presented embodiments.

According to one or more exemplary embodiments, a laser optical system includes: a beam splitter configured to split a laser beam into a first light and a second light by reflecting a portion of the laser beam and transmitting another portion of the laser beam; a first reflective member located in a path of the first light to reflect the first light; and a second reflective member located in a path of the first light to reflect the first light toward the beam splitter after the first light is reflected by the first reflective member, wherein a portion of the first light reflected toward the beam splitter is incident on and passes through the beam splitter and at least partially overlaps the second light.

The laser optical system may further include a driver configured to move the second reflective member in a direction toward the beam splitter or in a direction away from the beam splitter.

The driver may include an actuator that operates according to input electric signals.

The beam splitter may split the incident portion of the first light into a third light, which is light transmitted by the beam splitter, and a fourth light, which is light reflected from the beam splitter, wherein the third light overlaps the second light and the fourth light is incident on the first reflective member.

The second light and the third light may form a cross-sectional shape that is symmetrical about one axis.

The first reflective member may be at a fixed position and a fixed angle with respect to the beam splitter.

The second reflective member may be at a fixed angle with respect to the beam splitter and a fixed angle with respect to the first reflective member.

The first light may be incident on a different position of the beam splitter according to changes in a position of the second reflective member.

According to one or more exemplary embodiments, a laser annealing device includes: a laser oscillator irradiating a laser beam; and a laser optical system reshaping the laser beam irradiated from the laser oscillator and irradiating an element, wherein the laser optical system includes: a beam splitter configured to split the laser beam into a first light and a second light by reflecting a portion of the laser beam and transmitting another portion of the laser beam; a first reflective member located in a path of the first light to reflect the first light; and a second reflective member located in a path of the first light to reflect the first light toward the beam splitter after the first light is reflected by the first reflective member, wherein a portion of the first light reflected toward the beam splitter is incident on and passes through the beam splitter and at least partially overlaps the second light.

The laser annealing device may further include a driver configured to move the second reflective member in a direction toward the beam splitter or in a direction away from the beam splitter.

The driver may include an actuator that operates according to input electric signals.

The beam splitter may split the incident portion of the first light into a third light, which is light transmitted by the beam splitter, and a fourth light, which is light reflected from the beam splitter, wherein the third light overlaps the second light and the fourth light is incident on the first reflective member.

The second light and the third light may form a cross-sectional shape that is symmetrical about one axis.

The first reflective member may be at a fixed position and a fixed angle with respect to the beam splitter.

The second reflective member may be at a fixed angle with respect to the beam splitter and a fixed angle with respect to the first reflective member.

The first light may be incident on a different position of the beam splitter according to changes in a position of the second reflective member.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in more detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of" when preceding a list of elements, modify the entire list of elements and do not modify the individual elements of the list.

It will be understood that although the terms "first", "second", etc. may be used herein to describe various components, these components should not be limited by these terms. These components are only used to distinguish one component from another.

It will be understood that when a layer, region, or component is referred to as being "formed on," another layer, region, or component, it can be directly or indirectly formed on the other layer, region, or component. That is, for example, intervening layers, regions, or components may be present.

Hereafter, in drawings, like reference numerals refer to like elements throughout and overlapping descriptions shall not be repeated. Sizes of elements in the drawings may be exaggerated for convenience of explanation. In other words, since sizes and thicknesses of components in the drawings are arbitrarily illustrated for convenience of explanation, the following embodiments are not limited thereto.

Figure 1:
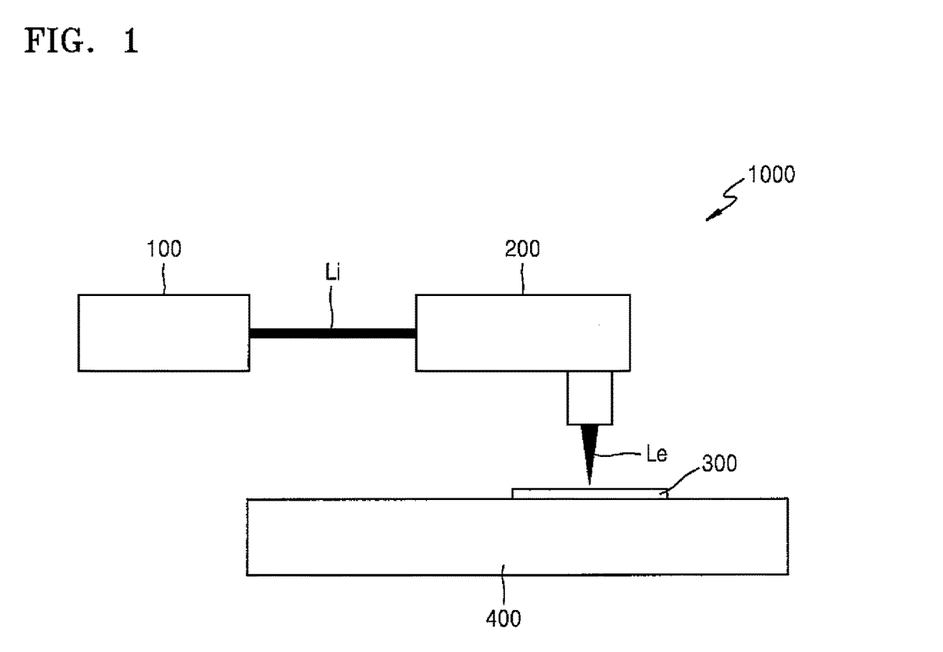
FIG. 1 is a schematic block diagram of a laser annealing device according to an exemplary embodiment.

FIG. 1 is a schematic block diagram of a laser annealing device according to an exemplary embodiment.

Referring to FIG. 1, a laser annealing device 1000 includes a laser oscillator 100 and a laser optical system 200. The laser oscillator 100 generates and irradiates a laser beam. A portion of the laser beam irradiated from the laser oscillator 100 and incident on the laser optical system 200, i.e., incident light Li, is converted into emitted light Le via the laser optical system 200, and the emitted light Le travels toward an element 300 that is placed on a stage 400.

The stage 400 includes a flat upper surface on which the element 300 may be placed. Here, the element 300 is placed so as to face the laser optical system 200. When a thin film transistor substrate is subjected to a laser annealing process, the element 300 may be an amorphous silicon layer that is formed on the thin film transistor substrate.

The laser optical system 200 is moveable in one direction or in directions perpendicular to each other. According to the movement of the laser optical system 200, an entire surface of the element 300 may be scanned by a laser beam. However, the present inventive concept is not limited thereto. In an exemplary embodiment, instead of the laser optical system 200, the stage 400 on which the element 300 is placed may be moveable in a direction opposite to the direction in which the laser optical system 200 would have been moved. In another exemplary embodiment, the laser optical system 200 and the stage 400 may both be moveable.

As such, the laser annealing device 1000 emits the emitted light Le toward the element 300, so as to crystallize amorphous silicon of the element 300 and thereby form polycrystalline silicon. A detailed description of the crystallization will be described by referring to FIG. 6. Hereinafter, the laser optical system 200 converting the incident light Li, i.e., the portion of the laser beam irradiated from the laser oscillator 100 and incident on the laser optical system 200, into the emitted light Le will be described in more detail.

Figure 2:
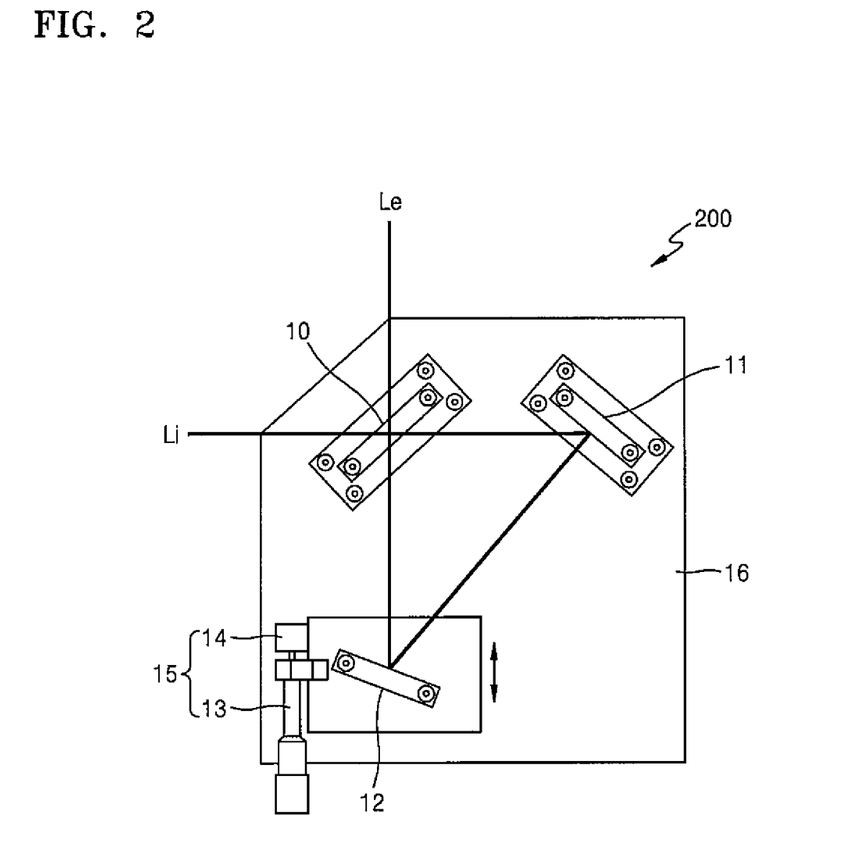
FIG. 2 is a schematic block diagram of a laser optical system according to an exemplary embodiment.
Figure 3:
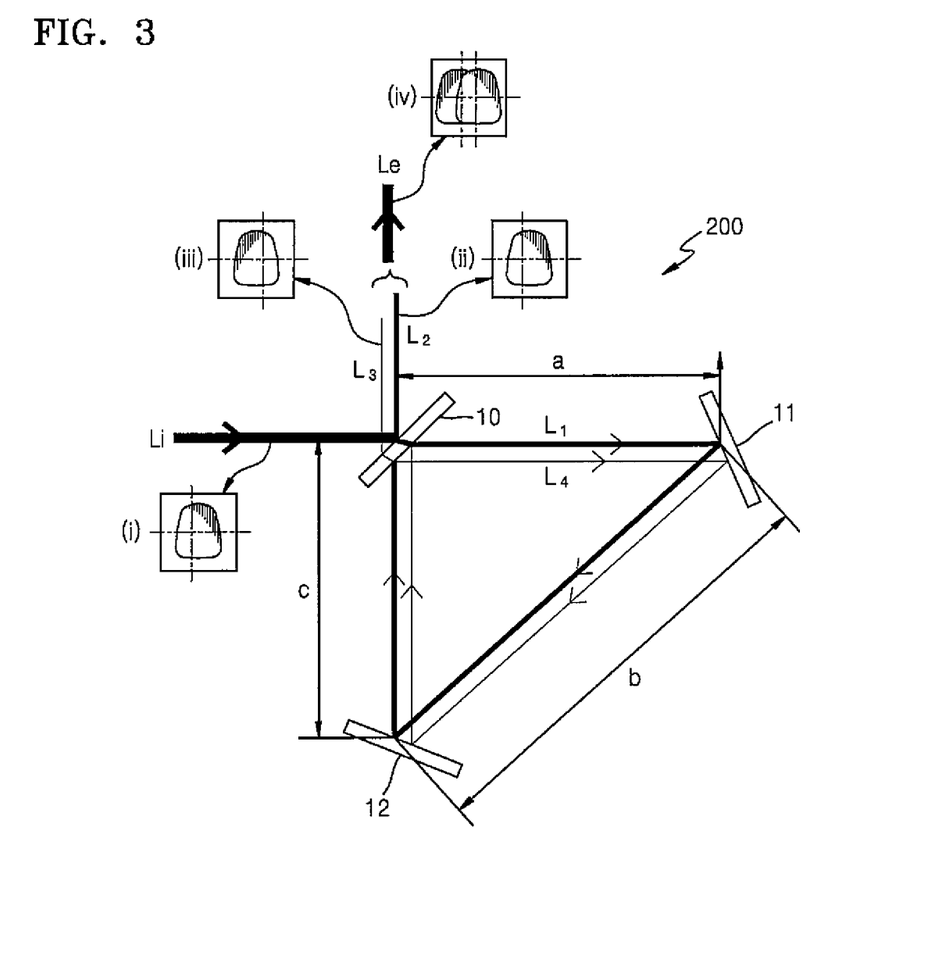
FIG. 3 is a schematic diagram for describing a laser beam transmitted with the laser optical system of FIG. 2.

FIG. 2 is a schematic block diagram of the laser optical system 200 according to an exemplary embodiment, and FIG. 3 is a schematic diagram for describing a laser beam transmitted by the laser optical system 200 of FIG. 2.

Referring to FIGS. 2 and 3, the laser optical system 200 includes a beam splitter 10, a first reflective member 11, and a second reflective member 12. In addition, the laser optical system 200 may further include a support 16 for supporting the components above, i.e., the beam splitter 10 and the first and second reflective members 11 and 12. In FIG. 2, the support 16 is shown in a flat form, but is not limited thereto. For example, the support 16 may be a housing inside of which the components are enclosed.

The beam splitter 10 is configured to reflect a portion of the light Li emitted and incident on the laser oscillator 100 of FIG. 1, or transmit another portion of the light Li emitted and incident on the laser oscillator 100 of FIG. 1. That is, the incident light Li is split into first light $L_1$, which is light transmitted by the beam splitter 10, and second light $L_2$, which is light reflected from the beam splitter 10.

The first reflective member 11 is placed in a path of the first light $L_1$ transmitted by the beam splitter 10. The first light $L_1$ is incident on the first reflective member 11, and then, a portion of the first light $L_1$ is reflected toward the second reflective member 12.

The first reflective member 11 is at a fixed position and a fixed angle with respect to the beam splitter 10. That is, the first reflective member 11 may be fixed at a set or predetermined location on a surface of the support 16 according to a screw connection method and/or an adhesive method, thereby being at a set or predetermined angle with respect to a line connecting the reflective member 11 and the beam splitter 10. Here, the beam splitter 10 may be also fixed at a different set or predetermined location on the surface of the support 16 in the same manner as the first reflective member 11. As such, when the first reflective member 11 and the beam splitter 10 are fixed at different locations on the support 16, only the second reflective member 12 is involved in controlling a cross-sectional shape of a laser beam, and accordingly, a structure of the laser optical system 200 may be further simplified.

The second reflective member 12 is disposed in a path of the first light $L_1$ reflected from the first reflective member 11. The first light $L_1$ is incident on the second reflective member 12, and then, a portion of the first light $L_1$ is reflected toward the beam splitter 10. Here, the second reflective member 12 is at a fixed angle with respect to the beam splitter 10 and the first reflective member 11.

The second reflective member 12 is moveable in a set or predetermined direction, unlike the beam splitter 10 and the first reflective member 11. That is, the second reflective member 12, which is inclined at a set or predetermined angle, may be moved in a direction toward the beam splitter 10 or in a direction away from the beam splitter 10, along a line connecting the beam splitter 10 and the second reflective member 12. In this regard, the laser optical system 200 may further include a driver 15 for driving the second reflective member 12, so that the second reflective member 12 may be moved as described above.

The driver 15 may be in a variety of forms, and for example, may include an actuator 13. The actuator 13 performs an operation for moving the second reflective member 12 in a set or predetermined direction based on input electric signals. The operation of the actuator 13 may be controlled by an on/off operation of a switch, or may be automatically controlled by a separate controller. In the case of a separate controller, a distance between the second reflective member 12 and the beam splitter 10 is controlled, so as to control in real time a width of the emitted light Le emitted from the laser optical system 200. The actuator 13 may be driven in a number of ways. As an example, the actuator 13 may be a linear actuator driven by a rotating motor 14.

Hereinafter, referring to FIG. 3, the laser beam sequentially transmitted by the beam splitter 10, the first reflective member 11, and the second reflective member 12 will be described in more detail. Here, for the convenience of understanding, examples of cross-sectional shapes of the incident light Li and transmitted light L2, L3, and Le are illustrated by (i) through (iv) of FIG. 3, but the examples are not limited thereto.

First, a laser beam generated and irradiated from the laser oscillator 100, and a portion of the laser beam irradiated from the laser oscillator 100 and incident on the laser optical system 200, i.e., incident light Li, travels toward the beam splitter 10 of the laser optical system 200. Here, compared to the intensity distribution of the incident light Li as indicated by the cross-section shown in (i) of FIG. 3, the intensity indicated at the upper right of the cross-section as viewed from the incident direction is assumed to be relatively high.

The incident light Li is split into the first light $L_1$, which is light transmitted by the beam splitter 10, and the second light $L_2$, which is light reflected from the beam splitter 10. Compared to the intensity distribution of the second light $L_2$ as indicated by the cross-section shown in (ii) of FIG. 3, the intensity indicated at the upper right of the cross-section as viewed from the emission direction is also assumed to be relatively high.

The first light $L_1$, which is light transmitted by the beam splitter 10, travels toward the first reflective member 11. Here, if a distance traveled by the first light $L_1$ from the beam splitter 10 to the first reflective member 11 is denoted as a, a has a constant value since the beam splitter 10 and the first reflective member 11 are fixed at constant angles at respective parts of the support 16 as shown in FIG. 2.

Next, the first light $L_1$ reflected from the first reflective member 11 travels toward the second reflective member 12. Here, if a distance traveled by the first light $L_1$ from the first reflective member 11 to the second reflective member 12 is denoted as b, b has a value which varies according to the position of the second reflective member 12, since the second reflective member 12 is moveable in a direction toward the beam splitter 10 or in a direction away from the beam splitter 10.

Next, the first light $L_1$ is reflected from the second reflective member 12, and then, travels toward the beam splitter 10. Here, if a distance traveled by the first light $L_1$ from the second reflective member 12 to the beam splitter 10 is denoted as c, c has a value which varies according to the movement of the second reflective member 12. In the present inventive concept, the c value may be controlled according to the movement of the second reflective member 12, and accordingly, a width of the emitted light Le may be also controlled. A detailed description regarding controlling of the width of the laser beam will be provided by referring to FIGS. 4A to 4C.

Next, a portion of the first light $L_1$ reflected from the second reflective member 12 and incident on the beam splitter 10 is transmitted by the beam splitter 10, and another portion of the first light $L_1$ is reflected from the beam splitter 10 and travels back to the first reflective member 11. That is, the first light $L_1$ is split into third light $L_3$, which is light transmitted by the beam splitter 10, and fourth light $L_4$, which is light reflected from the beam splitter 10. The transmitted third light $L_3$ is emitted from the beam splitter 10, and the reflected fourth light $L_4$ travels back to the first reflective member 11, and such a circulation of light repeats as described above.

Meanwhile, intensity profile of the first light $L_1$ is reversed when passing through the first reflective member 11 and the second reflective member 12. That is, the first light $L_1$, which is reflected from the second reflective member 12 and incident on the beam splitter 10, and the third light $L_3$, which is the portion of the incident light Li passing through the beam splitter 10, are reversed with respect to the incident light Li. Thus, the incident light Li is reversed side-to-side when passing through the laser optical system 200, and accordingly, as indicated by the cross-section shown in (iii) of FIG. 3, the intensity of the third light $L_3$ indicated at the upper left of the cross-section as viewed from the emission direction is relatively high.

Next, the second light $L_2$, which is the portion of the incident light Li reversed from the beam splitter 10, and the third light $L_3$, which is the portion of the incident light Li transmitted by the beam splitter 10 via the first and second reflective members 11 and 12, overlap each other, so as to form emitted light Le. That is, referring to (iv) of FIG. 3, the second light $L_2$ of which the intensity at the upper right of the cross-section is relatively high as in the case of the incident light Li, and the third light L3 of which the intensity at the upper left of the cross-section is relatively high according to the reversion of the incident light Li side-to-side, overlap each other. Thus, at least a portion of the third light $L_3$ overlaps the second light $L_2$, and accordingly, the second light $L_2$ and the third light $L_3$ form a cross-sectional shape that is symmetrical about one axis. As such, the second light $L_2$ and the third light $L_3$ partially overlap each other, so as to form emitted light Le. Accordingly, a laser width of the emitted light Le may be increased and vibration characteristics unique to a gas laser may be improved. In addition, the second light $L_2$ and the third light $L_3$ for forming the emitted light Le are reversed with respect to each other, and accordingly, as indicated by the cross-section shown in (iv) of FIG. 3, the intensity of the emitted light Le is uniformly distributed among the right and left sides.

As described above, the second light $L_2$ and the third light $L_3$ overlap each other to form the emitted light Le. Here, a laser width of the emitted light Le may vary according to the position of the second reflective member 12. Hereinafter, referring to FIGS. 4A to 4C, an exemplary embodiment in which a laser width of the emitted light Le varies according to the movement of the second reflective member 12 will be described.

Figure 4A:
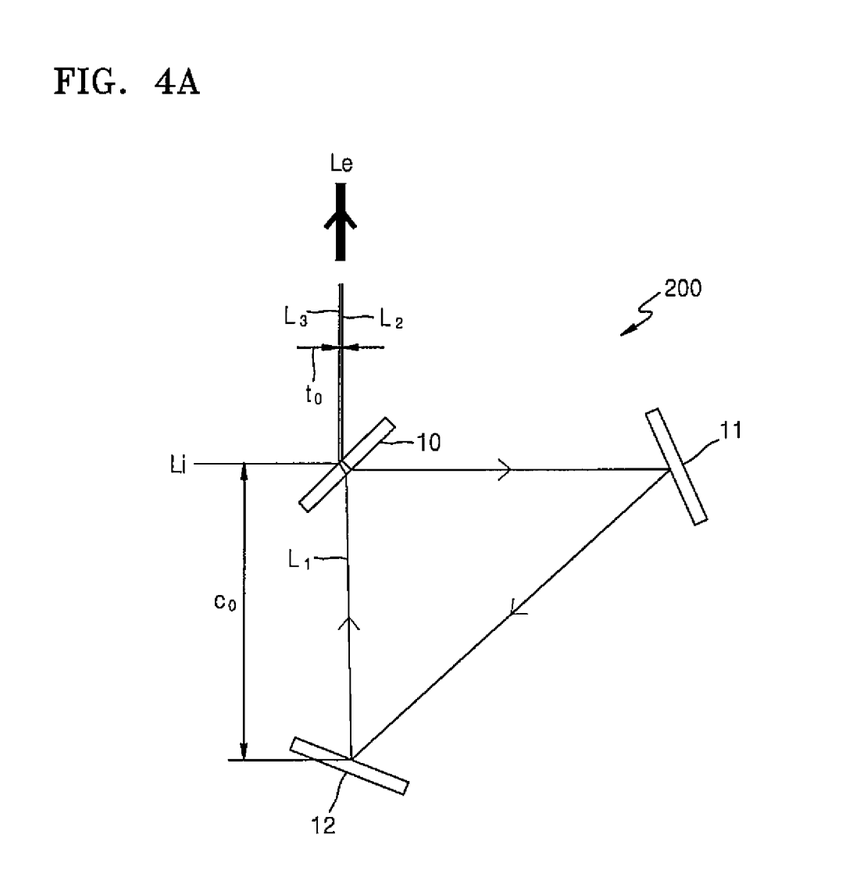
FIGS. 4A to 4C are each a schematic diagram for describing a laser beam of which a width is controlled in the laser optical system of FIG. 2.
Figure 4B:
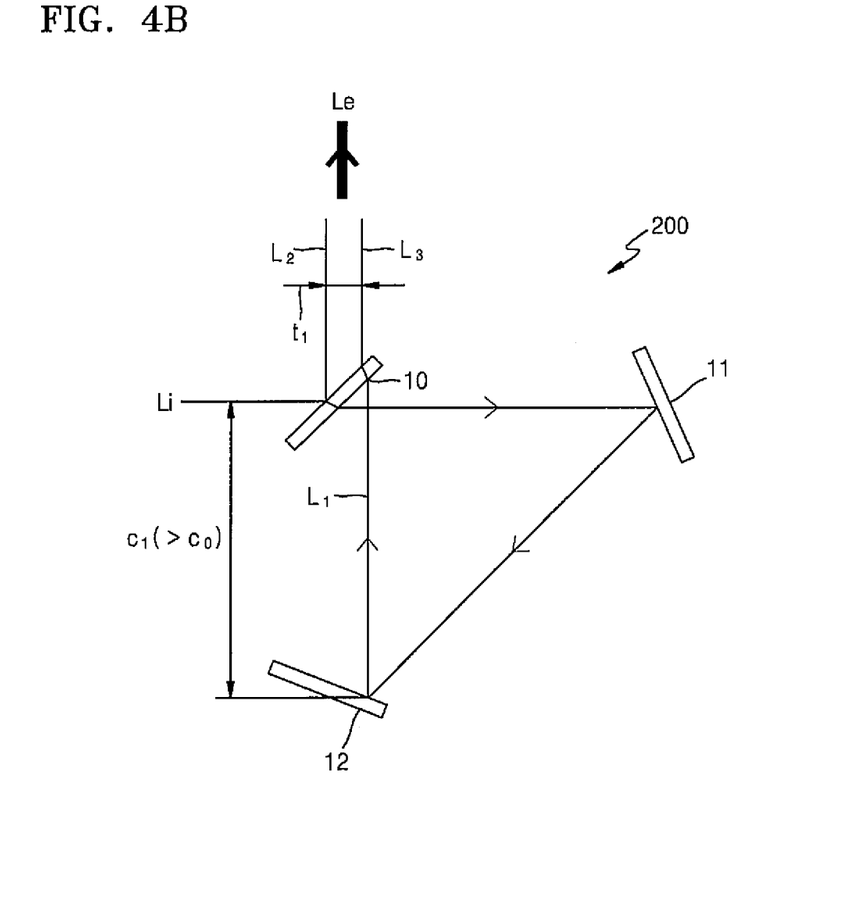
Figure 4C:
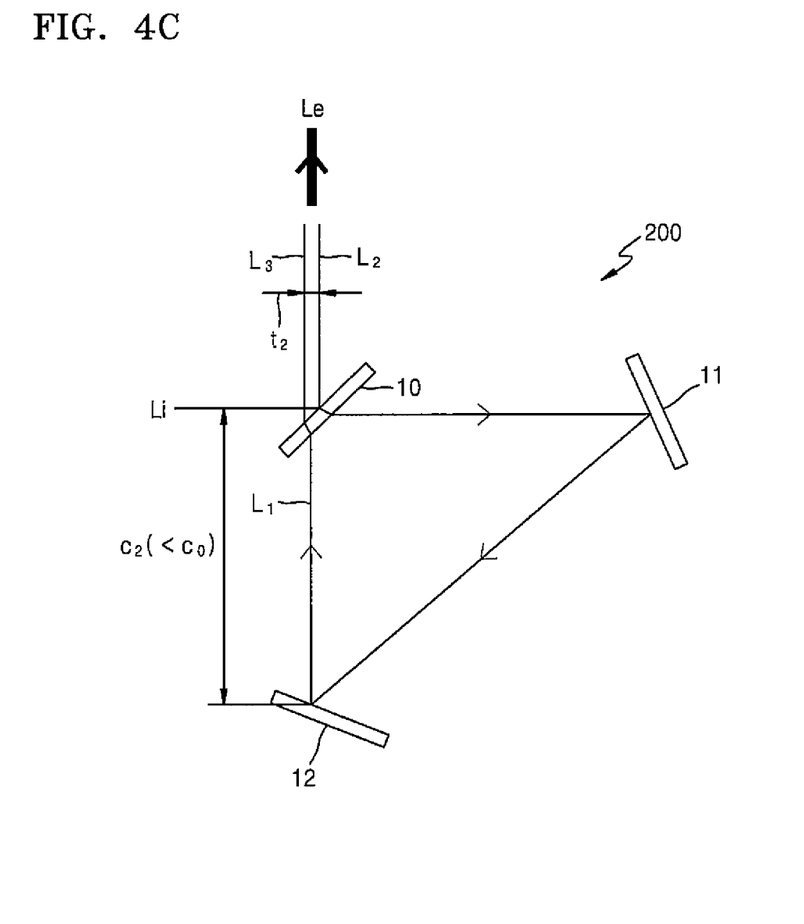

FIGS. 4A to 4C are each a schematic diagram for describing a laser beam of which a width is controlled in the laser optical system 200 of FIG. 2.

For the convenience of explanation, a position from which a portion of the incident light Li is reflected and emitted as the second light $L_2$ is assumed to constantly be the middle of the beam splitter 10.

First, referring to FIG. 4A, when a distance between the second reflective member 12 and the beam splitter 10 is denoted as a distance $c_0$, a width of the emitted light Le formed by the overlap between the second light $L_2$ and the third light $L_3$ is a width $t_0$, wherein the second light $L_2$ is the portion of the incident light Li reflected from the beam splitter 10, and the third light L3 is the portion of the incident light Li transmitted by the beam splitter 10. Here, a position from which the first light $L_1$ is reflected is assumed to constantly be in the middle of the second reflective member 12. Such a reflection position is the same throughout FIGS. 4B and 4C.

However, as shown in FIG. 4B, when a distance between second reflective member 12 and the beam splitter 10 is denoted as a distance $c_1$, which is longer than the distance $c_0$, a position where the first light LI is reflected from the second reflective member 12 is displaced in a direction away from the middle of the second reflective member 12. Accordingly, a width of the emitted light Le is changed to a width $t_1$ that is greater than the width $t_0$ of FIG. 4A.

Alternatively, as shown in FIG. 4C, when a distance between second reflective member 12 and the beam splitter 10 is denoted as a distance $c_2$, which is shorter than the distance $c_0$, a position where the first light $L_1$ is reflected from the second reflective member 12 is displaced in a direction opposite to the one direction away from the middle of the second reflective member 12 of FIG. 4B. Accordingly, a width of the emitted light Le is changed to the width $t_2$ that is also greater than the width $t_0$ of FIG. 4A.

That is, changes in the distance between the second reflective member 12 and the beam splitter 10 result in changes in the position where the first light $L_1$ is reflected from the second reflective member 12 and the position where the first light $L_1$ is incident on the beam splitter 10. In addition, changes in the position where the first light $L_1$ is incident on the beam splitter 10 result in changes in the position where the third light $L_3$ split from the first light $L_1$ is emitted, and the changes in the emission position of the third light $L_3$ results in changes in the width of the overlap between the second light $L_2$ and the third $L_3$. As described above, the emission position of the second light $L_2$ is assumed to be constant.

Therefore, when the distance between the second reflective member 12 and the beam splitter 10 is controlled, the width of the emitted light Le formed by the overlap between the second light $L_2$ and the third light $L_3$ may be also controlled. For example, when the size of the cross-section of the incident light Li is 35 mm×15 mm and the initial distance $c_0$ between the second reflective member 12 and the beam splitter 10 is 120 mm, the initial distance $c_0$ may be changed within a range of about 110 mm to about 130 mm, and accordingly, a width of the emitted light Le may be increased to be from about 5 mm to about 10 mm.

In the present inventive concept, the width of the emitted light Le may be controlled by adjusting the amount of overlap between two laser beams that reverse right and left sides with respect to each other, and accordingly, a desired (or optimized) cross-sectional shape of the beam layer may be obtained for an annealing process. That is, the laser beam may be controlled in a spatial manner. In addition, the laser beam may also be controlled in a temporal manner by delaying emission time to allow for a portion of the laser beam to pass through the laser optical system 200. Hereinafter, the effect caused by delaying the emission time of the laser beam will be described in connection with FIG. 5. Here, for the convenience of explanation, the effect will be described by referring to FIG. 3 as well.

Figure 5:
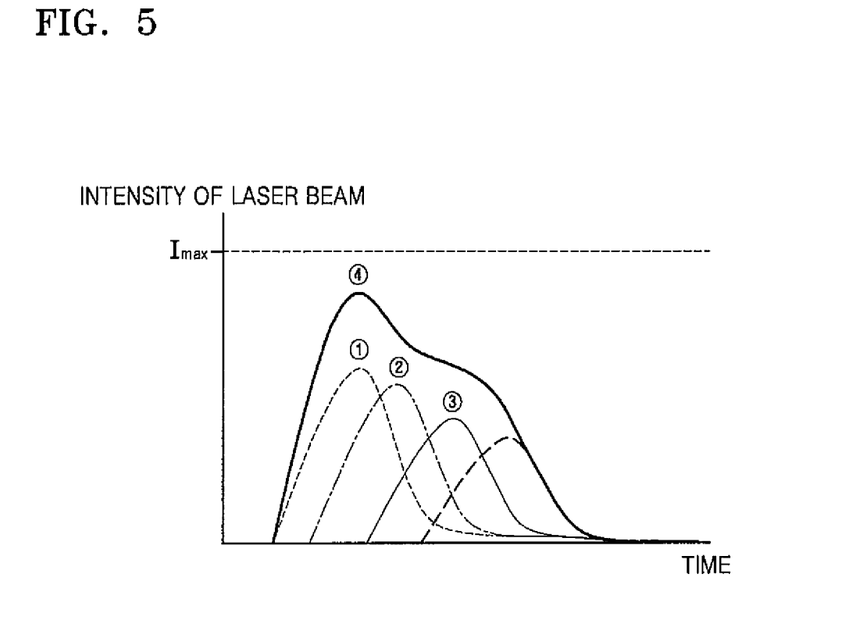
FIG. 5 is a graph showing the intensity of emitted light in the laser optical system of FIG. 2 in accordance with time.

FIG. 5 is a graph emitted light intensity of the laser optical system 200 of FIG. 2 in accordance with time.

The second light $L_2$, which is reflected and emitted as a portion of the incident light Li, is emitted as a pulse form as shown by ①.

Afterwards, no later than completion of one pulse of the second light $L_2$, the first light $L_1$, which is transmitted light as a portion of the incident light Li, is incident on the beam splitter 10 via the first and second reflective members 11 and 12. Here, the third light $L_3$, which is incident on the beam splitter 10 as a portion of the first light $L_1$, is emitted from the beam splitter 10 as a pulse form as shown by ②.

Likewise, no later than completion of one pulse of the third light $L_3$, the fourth light $L_4$, which is reflected light as a portion of the first light $L_1$, is incident on the beam splitter 10 via the first and second reflective members 11 and 12, and a portion of the fourth light $L_4$ passes through the beam splitter 10 to be emitted as a pulse form as shown by ③.

Therefore, by repeating a process in which subsequent emitted light is emitted no later than the completion of one pulse of the previous emitted light, overall pulse duration is increased as shown by ④ in FIG. 5. When the pulse duration increases in this manner, the amount of time for a reaction to occur between the laser beam and the beam-projected element is also increased, thereby obtaining sufficient conditions for annealing in the crystallization process of the beam-projected element.

For each of the emitted light passing through the laser optical system 200, the time delay associated with a pulse thereof is calculated by dividing distance traveled by the laser beam in the laser optical system 200 by the velocity v of the laser beam. For example, in FIG. 3, the time delay until the third light $L_3$, which is split from the first light $L_1$, is emitted is calculated by a formula (a+b+c)/v. Here, the velocity v of the light is $3 \times 10^8$ m/s.

According to the formula above, the time delay of the emitted light is also dependent upon the distance c between the beam splitter 10 and the second reflective member 12. That is, a width of the emitted light Le and pulse duration of the emitted light may be also controlled by moving the second reflective member 12 toward the beam splitter 10 or away from the beam splitter 10. When the position of the second reflective member 12 is automatically controlled by a separate controller, temporal and/or spatial distribution of the laser beam to be emitted may be controlled in real time.

Meanwhile, when the laser beam is circulated in the laser optical system 200 several times, a reduction in intensity of the laser beam may occur in some cases. That is, as shown in FIG. 5, the maximum pulse intensity of the emitted laser beam is lowered. Therefore, in one embodiment, the lowering of the intensity of the emitted light Le is compensated by increasing the intensity of the incident light Li.

Hereinafter, by referring to FIG. 6, a process of crystallizing amorphous silicon of the element 300 into polycrystalline silicon will be described in more detail.

Figure 6:
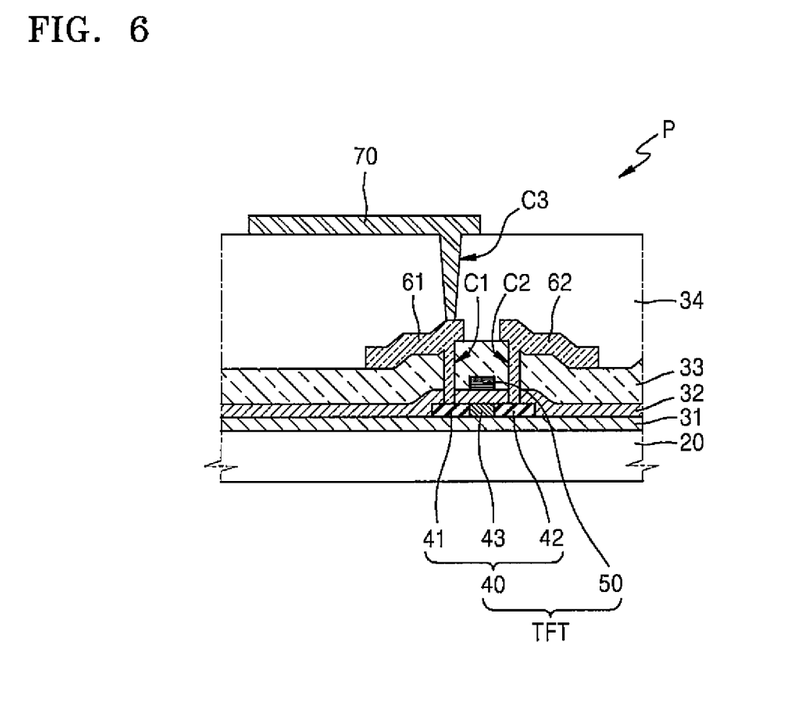
FIG. 6 is a schematic cross-sectional diagram of a thin film transistor prepared by using a laser annealing device according to an exemplary embodiment and a display device including the thin film transistor.

FIG. 6 is a schematic cross-sectional diagram of a thin film transistor prepared by using the laser annealing device according to an exemplary embodiment and a display device including the thin film transistor.

Referring to FIG. 6, a buffer layer 31 may be formed on a substrate 20 to prevent diffusion of impurity ions and penetration of moisture or external air and to provide a planarized surface. Here, the substrate 20 may be an insulating substrate formed of glass, plastic, and/or the like. The buffer layer 31 may include an inorganic insulating material, such as silicon oxide and/or silicon nitride, and/or an organic insulating material, such as polyimide, polyester, and/or acryl. The buffer layer 31 is not an essential component, and thus may be omitted according to a process.

A semiconductor layer 40 may be formed on the buffer layer 31, wherein the semiconductor layer 40 is formed of poly-crystalline silicon and includes a channel region 43 and source and drain regions 41 and 42 that are each formed on both sides of the channel region 43. Here, the source and drain regions 41 and 42 may be doped with n-type or p-type impurities, and may include a silicide layer. Hereinafter, a method of forming the semiconductor layer 40 will be described in more detail.

An amorphous silicon thin film is formed on the substrate 20 by stacking amorphous silicon according to a low-pressure chemical vapor deposition method, a plasma enhanced chemical vapor deposition method, and/or a sputtering method. According to the silicon crystalline, silicon can be classified as either amorphous silicon or poly-crystalline silicon. Amorphous silicon may be deposited as a thin film at a relatively low temperature, but due to a lack of ordered configuration of atoms, electrical characteristics thereof are relatively poor and there are difficulties in upsizing the amorphous silicon. In contrast, poly-crystalline silicon has excellent current flow compared to amorphous silicon, and has good electrical characteristics as the size of grains increases. In the case of using a glass insulating substrate having a lower melting point, an amorphous silicon thin film is deposited on the substrate 20, and then, converted into a poly-crystalline silicon thin film. Here, to improve crystallinity of the silicon thin film deposited on the substrate 20, the substrate 20 is generally subjected to a heat treatment accompanied by laser annealing.

In regard to the laser annealing method, a laser annealing device is used at the beginning to pre-heat a permeable lens. The laser annealing device radiates laser beam to the amorphous silicon thin film only in a case when the permeable lens reaches and maintains a constant temperature. In this regard, the amorphous silicon thin film is crystallized into a poly-crystalline silicon thin film. Accordingly, the crystallinity of the poly-crystalline silicon is uniformly formed, and a thin film transistor (TFT) to be completed may also have uniformly maintained characteristics.

Meanwhile, a gate insulating layer 32 is formed on top of the substrate 20, wherein the gate insulating layer 32 is formed of silicon oxide ($SiO_2$) and/or silicon nitride ($SiN_x$) and covers the semiconductor layer 40. In addition, a gate electrode 50 is formed on top of the gate insulating layer 32 to correspond to the channel region 43. An interlayer insulating layer 33 is formed on top of the gate insulating layer 32 to cover the gate electrode 50, and the gate insulating layer 32 and the interlayer insulating layer 33 include contact openings (e.g., contact holes) C1 and C2 to expose the source and drain regions 41 and 42 of the semiconductor layer 40. A source electrode 61, which is connected with the source drain 41 via the contact opening C1, and a drain electrode 62, which faces the source electrode 61 and is connected with the drain region 42 via the contact opening C2, are formed on the interlayer insulating layer 33. The interlayer insulating layer 33 is covered by a protective layer 34, wherein the protective layer 34 is formed of an inorganic insulating material, such as oxide, nitride, and/or oxynitride, or an organic insulating material. The protective layer 34 also includes a contact opening C3 that exposes the source electrode 61. A pixel electrode 70 is formed on top of the protective layer 34 and is connected with the source electrode 61 via the contact opening C3. Here, the pixel electrode 70 may be formed to be connected with the drain electrode 62, rather than the source electrode 61. The pixel electrode 70 may be a transparent electrode or a reflective electrode. When the pixel electrode 70 is used as a transparent electrode, the pixel electrode 70 may include ITO, IZO, ZnO, and/or $In_2O_3$. In addition, when the pixel electrode 70 is used as a reflective electrode, the pixel electrode 70 may be formed in a multi-layer structure including a first layer formed of Ag, Mg, Al, Pt, Pd, Au, Ni, Nd, Ir, Cr, and compounds thereof and a second layer formed on the first layer and including ITO, IZO, ZnO, and/or $In_2O_3$.

Although not shown in FIG. 6, a common electrode, which may be a transparent electrode or a reflective electrode, and an intermediate layer including an organic light-emitting layer, may be formed on top of the pixel electrode 70. In addition, a pixel-defining layer, which defines a pixel by exposing a portion of the common electrode, may be disposed on top of the protective layer 34.

Meanwhile, the structure of the TFT and a display device P including the TFT is not limited to the exemplary embodiments of the present inventive concept, and may be modified variously according to the design thereof.

As described above, according to the one or more of the above exemplary embodiments, a laser optical system and a laser annealing device including the laser optical system may obtain a cross-sectional shape of a laser beam, the cross-sectional shape being set (or optimized) by controlling a width of a laser beam.

In addition, the laser optical system and the laser annealing device including the laser optical system according to the one or more of the above exemplary embodiments may improve the uniformity of the cross-sectional shape of the laser beam.

In addition, the laser optical system and the laser annealing device including the laser optical system according to the one or more of the above exemplary embodiments may obtain sufficient annealing effects by increasing a period of time for a reaction between the laser beam and a beam-projected element.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:
1. A laser optical system comprising:
  a beam splitter configured to split a laser beam into a first light and a second light by reflecting a portion of the laser beam and transmitting another portion of the laser beam;

a first reflective member located in a path of the first light to reflect the first light; and a second reflective member located in a path of the first light to reflect the first light toward the beam splitter after the first light is reflected by the first reflective member, wherein a portion of the first light reflected toward the beam splitter is incident on and passes through the beam splitter and at least partially overlaps the second light, wherein the beam splitter is configured to split the incident portion of the first light into a third light, which is light transmitted by the beam splitter, and a fourth light, which is light reflected from the beam splitter, and wherein the third light overlaps the second light, and the fourth light is incident on the first reflective member.

2. The laser optical system of claim 1, further comprising a driver configured to move the second reflective member in a direction toward the beam splitter or in a direction away from the beam splitter.

3. The laser optical system of claim 2, wherein the driver comprises an actuator configured to operate according to input electric signals.

4. The laser optical system of claim 1, wherein the second light and the third light form a cross-sectional shape that is symmetrical about one axis.

5. The laser optical system of claim 1, wherein the first reflective member is at a fixed position and a fixed angle with respect to the beam splitter.

6. The laser optical system of claim 5, wherein the second reflective member is at a fixed angle with respect to the beam splitter and a fixed angle with respect to the first reflective member.

7. The laser optical system of claim 1, wherein the first light is incident on a different position of the beam splitter according to changes in a position of the second reflective member.

8. A laser annealing device comprising:
a laser oscillator configured to irradiate a laser beam; and
a laser optical system configured to reshape the laser beam irradiated from the laser oscillator and to irradiate an element,
wherein the laser optical system comprises:
a beam splitter configured to split the laser beam into a first light and a second light by reflecting a portion of the laser beam and transmitting another portion of the laser beam;
a first reflective member located in a path of the first light to reflect the first light; and
a second reflective member located in a path of the first light to reflect the first light toward the beam splitter after the first light is reflected by the first reflective member,
wherein a portion of the first light reflected toward the beam splitter is incident on and passes through the beam splitter and at least partially overlaps the second light.

9. The laser annealing device of claim 8, further comprising a driver configured to move the second reflective member in a direction toward the beam splitter or in a direction away from the beam splitter.

10. The laser annealing device of claim 9, wherein the driver comprises an actuator configured to operate according to input electric signals.

11. The laser annealing device of claim 8, wherein the beam splitter is configured to split the incident portion of the first light into a third light, which is light transmitted by the beam splitter, and a fourth light, which is light reflected from the beam splitter,
wherein the third light overlaps the second light, and the fourth light is incident on the first reflective member.

12. The laser annealing device of claim 11, wherein the second light and the third light form a cross-sectional shape that is symmetrical about one axis.

13. The laser annealing device of claim 8, wherein the first reflective member is at a fixed position and a fixed angle with respect to the beam splitter.

14. The laser annealing device of claim 8, wherein the second reflective member is at a fixed angle with respect to the beam splitter and a fixed angle with respect to the first reflective member.

15. The laser annealing device of claim 8, wherein the first light is incident on a different position of the beam splitter according to changes in a position of the second reflective member.

* * * * *